(12) United States Patent
Knox et al.

(10) Patent No.: US 12,073,393 B2
(45) Date of Patent: Aug. 27, 2024

(54) TRANSACTION CONFIGURATION USING CRYPTOGRAPHIC AUTHENTICATION

(71) Applicant: PayPal, Inc., San Jose, CA (US)

(72) Inventors: Joshua Knox, Palo Alto, CA (US); Sandeep Kumar, Fremont, CA (US); Kin Kee, Alameda, CA (US)

(73) Assignee: PayPal, Inc., San Jose, CA (US)

( * ) Notice: Subject to any disclaimer, the term of this patent is extended or adjusted under 35 U.S.C. 154(b) by 561 days.

(21) Appl. No.: 16/887,836

(22) Filed: May 29, 2020

(65) Prior Publication Data

US 2021/0374735 A1 Dec. 2, 2021

(51) Int. Cl.
*G06Q 20/38* (2012.01)
*G06Q 20/32* (2012.01)
*H04L 9/30* (2006.01)

(52) U.S. Cl.
CPC ..... *G06Q 20/3829* (2013.01); *G06Q 20/3224* (2013.01); *H04L 9/30* (2013.01); *H04L 2209/56* (2013.01)

(58) Field of Classification Search
CPC .................... G06Q 20/00–425; H04L 9/00–50
See application file for complete search history.

(56) References Cited

U.S. PATENT DOCUMENTS

| | | | |
|---|---|---|---|
| 7,398,253 B1 | 7/2008 | Pinnell | |
| 8,307,210 B1 | 11/2012 | Duane | |
| 10,404,703 B1* | 9/2019 | Peterson | G06Q 30/06 |
| 11,012,237 B1* | 5/2021 | Sarda | H04L 9/0861 |
| 2004/0073518 A1* | 4/2004 | Atkinson | G06Q 20/3825 705/65 |
| 2018/0075418 A1* | 3/2018 | Knox | G06Q 20/3821 |

* cited by examiner

*Primary Examiner* — Ari Shahabi
(74) *Attorney, Agent, or Firm* — Kowert, Hood, Munyon, Rankin & Goetzel, P.C.; Gareth M. Sampson; Dean M. Munyon

(57) ABSTRACT

A cryptographic scheme associated with a transaction service is received at a first computer system. Subsequent to receiving the cryptographic schema, the first computer system performs a configuration process for a transaction to be performed with the transaction service. The configuration process includes receiving a request for transaction configuration information from a client device. The request includes a cryptographic token generated by a second computer system the transaction service. The first computer system determines whether to grant the request based on analyzing the cryptographic token according to the cryptographic schema. Based on the determining, the first computer system sends transaction configuration information. The configuration process is performed by first computer system independent of communication between the second computer system and the first computer system.

19 Claims, 7 Drawing Sheets

TRANSACTION CONFIGURATION USING CRYPTOGRAPHIC AUTHENTICATION

BACKGROUND

Technical Field

This disclosure relates generally to cryptographic authentication by various computer systems, and particularly in the context of a transaction service implemented using distributed computer systems.

Description of the Related Art

When computer systems communicate with each other to perform a transaction, ensuring the authenticity of the computer systems is an important aspect of maintaining security. Cryptography is frequently used to ensure authenticity of computer systems. A first computer system seeking access to second computer system may present a cryptographic token purporting to attest to the authenticity of the first computer system. If the second computer system is able to determine that the cryptographic token is authentic, then second computer system may have more assurances of the authenticity of the first computer system that presented the cryptographic token. Based on this determination of authenticity, the second computer system can grant the access sought by the first computer system.

Figure 1:
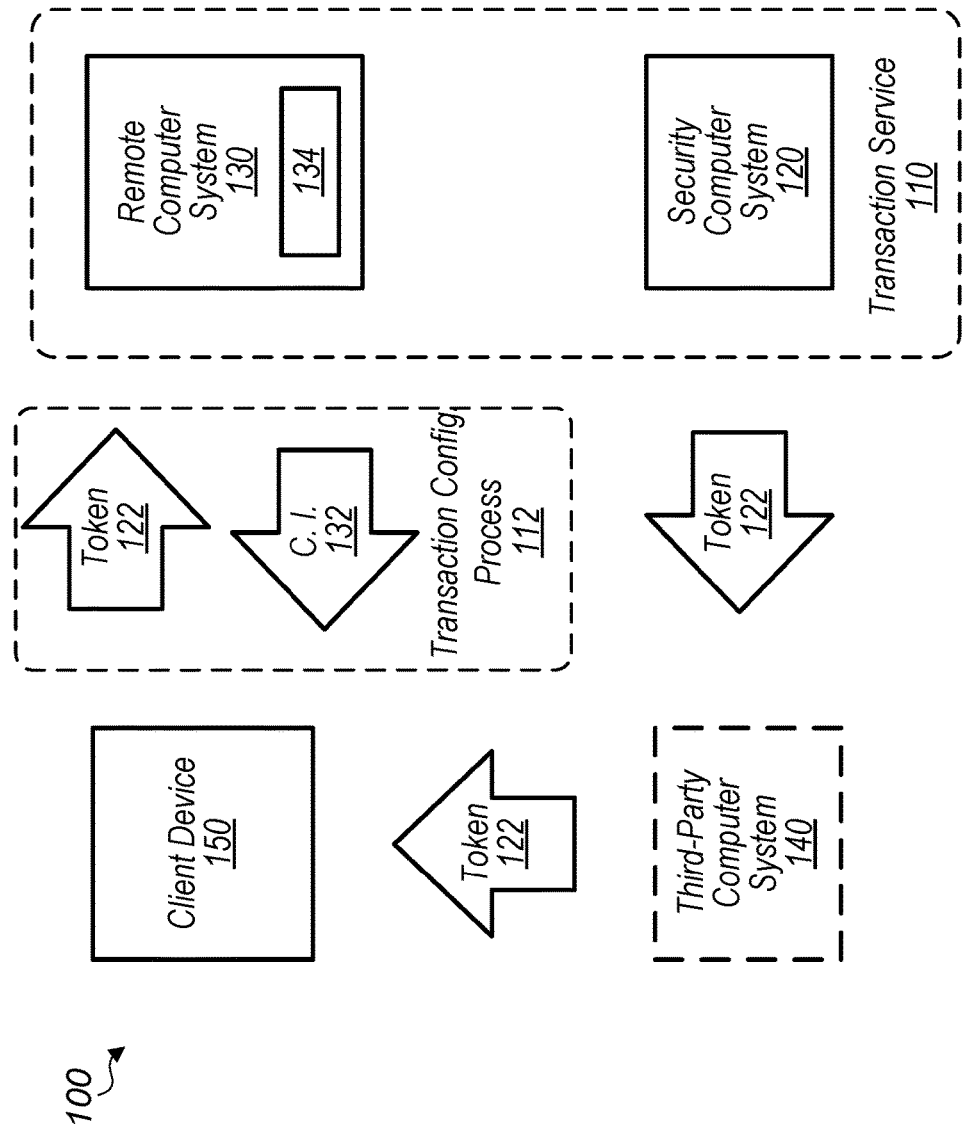
FIG. 1 is a block diagram illustrating an embodiment of a computer system configured to facilitate transaction configuration pin accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive a cryptographic token" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" remote computer system would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

When the term "or" is used in this disclosure with respect to a list of options, it will generally be understood to be used in the exclusive sense unless the context provides otherwise. Thus, a recitation of "x or y" is equivalent to "either x or y, but not both." On the other hand, a recitation such as "x or y, or both" is to be interpreted in the inclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

As used herein, the term "platform" refers to an environment that includes a set of resources that enables some functionality (for example, in the context of the present disclosure, automated decision making). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, an automated decision-making platform according to the present disclosure provides resources for performing automated decision making; users may utilize the platform to carry out instances of automated decision making. Embodiments of the automated decision-making platform described herein thus enable the functionality of automated decision making to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

In a distributed computing environment, security and performance can sometimes be at cross-purposes. Distributing security tasks throughout a network can improve performance by reducing latency but potentially decreasing security by exposing sensitive security information to attack. But centralizing security tasks may particularly degrade performance when the various components of the distributed computing environment are spread out over a large geographic area in which communications between components has material amounts of latency. To maintain security, various cryptographic techniques can be employed to ensure that an attempt to access particular resources in the distributed computing environment is authentic and is being made by a client with adequate access rights to the particular resources. This disclosure addresses various deficiencies in previous techniques to authenticate and securely facilitate transactions across a geographic area. Firstly, if a determination of whether a particular access attempt is authentic and authorized is made by a centralized security computer system in the distributed computing environment, then latency across the geographic area may degrade performance. Secondly, if many security computer systems are distributed throughout the geographic area, security may be degraded by exposing more copies of private keys or other sensitive cryptographic information.

Referring now to FIG. 1, a block diagram is shown depicting a computer system 100 in accordance with various embodiments. Computer system 100 includes one or more security computer systems 120 and one or more remote computer systems 130 that are associated with a transaction service 110 and a client device 150. In various embodiments, computer system 100 includes a third-party computer system 140. While FIG. 1 depicts only one transaction service 110, one security computer system 120, one remote computer system 130, one third-party computer system 140, and one client device 150, in various embodiments more than one of some or all of these components of computer system 100 may be present. For example, a transaction service 110 may include a plurality of security computer systems 120 and a plurality of remote computer systems 130 and may be in communication with a plurality of third-party computer systems 140 and client devices 150. Further, in some embodiments, a plurality of different transaction services 110 may be present. Thus, while the following discussion of FIG. 1 discusses each component of computer system 100 in the singular, it will be understood that the techniques are applicable to embodiments with more than one of some or all of the components of computer system 100.

Transaction service 110 is a computer-implemented service that is operable to facilitate electronic transactions between parties (e.g., a first user of client device 150 and a second user of third-party computer system 140). In various embodiments, transaction service 110 is operable to facilitate access to secure electronic resources (e.g., one or more secured servers or files, a secured electronic mailbox, a secure website, etc.). In various other embodiments, transaction service 110 is operable to facilitate electronic payments between parties. For example, in some embodiments a first party uses client device 150 to purchase a good or service from an electronic storefront associated with a merchant that is associated with third-party computer system 140 and uses transaction service 110 to facilitate the payment portion of the transaction. Further, in some embodiments a first party users client device 140 to access an electronic resource associated with third-party computer system 140 (e.g., a secure web site) and uses transaction service 110 to facilitate the decision to grant such access, As discussed in further detail in reference to FIG. 2, the various components of transaction service 110 including the one or more security computer systems 120 and one or more remote computer systems 130 are operable to perform various actions associated with facilitating the transaction. In various embodiments, such tasks include portions of the transaction configuration process 112 discussed herein (e.g., the operations associated with the request, exchange, and use of configuration information 132).

Security computer system 120 is a computer system that is operable to generate a token 122 that is useable by a client device 150 to authenticate the client device 150 with remote computer system 130 according to the cryptographic schema 134. In various embodiments, security computer system 120 is implemented by software running on a computer system (e.g., a desktop computer, a laptop computer, a tablet computer, a mobile phone, a server) or a plurality of computer systems (e.g., a network of servers operating as a cloud). In other embodiments, security computer system 120 is implemented in specialized hardware (e.g., on an FPGA) or in a combination of hardware and software. In various embodiments, security computer system 120 is operable to perform other functions in addition to generating tokens 122.

Token 122 is a cryptographic token that is useable by client device 150 to authenticate the client device 150 with remote computer system 130 according to the cryptographic schema 134 that is associated with transaction configuration service 110. In some embodiments, secure computer system 120 generates token 122 and sends token 122 to third-party computer system 140, and then third-party computer system 140 sends token 122 to client device 150. In other embodiments, however, computer system 100 does not include third-party computer system 140 and security computer system 120 sends token 122 to client device 150. In some embodiments, token 122 is encrypted or otherwise protected when it is sent from security computer system 120 to third-party computer system 140 and/or when it is sent from third-party computer system 140 to client device 150. In other embodiments, token 122 is not altered or encrypted as it is sent between the various components of computer system 100 (e.g., the same stream of bits is sent from security computer system 120 to third-party computer system 140 to client device 150 and then to remote computer system 130). In various embodiments, token 122 includes cryptographic information (e.g., a cryptographic key) that can be authenticated by remote computer system 130 using cryptographic information. In various embodiments, in addition to such cryptographic information, token 122 includes information useable by remote computer system 130 to determine whether to send configuration information 132 to client device 150.

As discussed herein, in various embodiments, remote computer system 130 has received a copy of cryptographic schema 134 prior to the commencement of transaction configuration process 112 such that remote computer system 130 is operable to authenticate client device 150 and generate transaction configuration information 132 for client device 150 independent of communication between remote computer system 130 and security computer system 120. In some of such embodiments, remote computer system 130 and security computer system 120 do not communicate at all during the time that transaction configuration process 112 is occurring. In other embodiments, remote computer system 130 and security computer system 120 exchange communication about something other than transaction configuration process 112 and the progress of transaction configuration process 112 is not affected by such communication. For example, such communication might be a general status inquiry to which remote computer system 130 may respond, but neither the general status inquiry nor the response affects the duration of transaction configuration process 112. In various embodiments, one or more remote computer systems 130 and/or security computer system 120 may exchange communications relating to cryptographic schema 134 (e.g., updates to cryptographic schema 134 for subsequent transaction configuration processes 112) or status information useable for load balancing among the various components of transaction service 110, but these communications similarly do not affect a transaction configuration process 112 between a particular remote computer system 130 and a particular client device 150. Accordingly, as used herein "independent of communication" means that during a transaction configuration process 112 between a particular client device 150 and a particular remote computer system 130 that either (a) that there is no communication between the particular remote computer system 130 and another remote computer system 130 and/or security computer system 120, or (b) that any communication between the particular remote computer system 130 and another remote computer system 130 and/or security computer system 120 does not affect (e.g., is not used by) the transaction configuration process 112.

Remote computer system 130 is a computer system that is operable to authenticate client device 150 based on token 122. In various instances, remote computer system 130 is operable to generate transaction configuration information 132 and, contingent on authentication of client device 150, send transaction configuration information 132 to client device 150 as part of transaction configuration process 112. In various embodiments, remote computer system 130 is implemented by software running on a computer system (e.g., a desktop computer, a laptop computer, a tablet computer, a mobile phone, a server) or a plurality of computer systems (e.g., a network of servers operating as a cloud). In other embodiments, remote computer system 130 is implemented in specialized hardware (e.g., on an FPGA) or in a combination of hardware and software. Token 122, remote computer system 130, and cryptographic schema 134 are discussed in further detail in reference to FIGS. 2, 4, and 5.

Subsequent to receiving token 122, client device 150 engages in transaction configuration process 112 with one or more remote computer systems 130. Transaction configuration process 112 is a process by which client device 150 requests and receives, from one or more remote computer systems 130, configuration information 132 for a contemplated transaction that is useable by client device 150 to properly access transaction service 110 and to interact with a user of client device 150 to complete the contemplated transaction. As used herein, the term "contemplated transaction" refers to the actual transaction that may be facilitated by transaction service 110 (e.g., a purchase, a granting of access to a secure resources). The contemplated transaction is attempted subsequent to and based on configuration process 112. In various instances, configuration process 112 can be successfully completed but the contemplated is not for any of a number of reasons (e.g., cancelation by a user of client device 150, a request to access secure files is denied, a form of payment is declined, etc.).

In transaction configuration process 112, client device 150 authenticates itself with one or more remote computer systems 130 using token 122. In various instances, client device 150 includes token 122 in a request for configuration information 132. As discussed herein in further detail in reference to FIG. 3, such a request includes additional information in various embodiments. During transaction configuration process 112, the one or more remote computer systems 130 is operable to receive token 122 (and the request for configuration information 132 and/or additional information) from client device 150, determine whether to send configuration information 132 to client device 150 and what configuration information 132 to send (e.g., based on token 122, based on a request that includes token 122), and based on this determination send configuration information 132 to client device 150. In various embodiments, for example, configuration information 132 includes information generated for client device 150 based on a location of client device 150 determined by client device 150 and sent in the request for configuration information 132 and/or determined by remote computer system 130 independently. The content of configuration information 132 and how configuration information 132 is determined and generated is discussed in further detail in reference to FIGS. 2 and 4.

In various embodiments, computer system 100 includes one or more third-party computer systems 140. Third-party computer system 140 is a computer system that is operable to receive token 122 from security computer system 120 and relay it to client device 150. In various embodiments, third-party computer system 140 is associated with the counterparty to the user of client device 150 in the transaction being facilitated by transaction service 110. In some embodiments, third-party computer system 140 is associated with a merchant's ecommerce storefront on which goods or service are offered for sale, rental, etc. In other embodiments, third-party computer system 140 controls accesses to secure electronic resources (e.g., a secure server, a secure website, secured files, etc.) that is made available to client device 150 after successfully completing a transaction (e.g., a transaction in which client device 150 is authenticated by transaction service 110 and approved for access to a secure resource). Accordingly, in various embodiments third-party computer system 140 and client device 150 engage in communications beyond third-party computer system 140 sending token 122 to client device 150 including but not limited to third-party computer system 140 sending web pages, sounds, images, videos, or other information to client device 150 for display or playback on client device 150, client device 150 sending information indicative of selections made by a user of client device 150, and third-party computer system 140 sending secure files to client device 150 after the transaction to gain access to such secure files has been completed.

In various embodiments, client device 150 is any of a number of computer systems that are operable to communicate with transaction service 110 (and in some embodiments with third-party computer system 140) to perform a transaction. In various embodiments, client device 150 is any of a number of types of computer systems including but not limited to a desktop computer, a laptop computer, a tablet computer, a wearable computer such as a smart watch, a mobile phone. In various embodiments, user device 150 communicates with transaction service 110 (and in some embodiments with third-party computer system 140) over a local area network, a wide area network (e.g., the Internet), or a combination of both. Client device 150 is discussed in further detail in reference to FIG. 3.

Accordingly, by using a cryptographic schema 134 that is distributed to remote computer systems 130 prior to the start of transaction configuration process 112, the various remote computer systems 130 are operable to authenticate client device 150 based on token 122 without having to communicate with security computer system 120. Thus, any latency between remote computer system 130 and security computer system 120 is avoided during transaction configuration process 112. Moreover, because security computer system 120 is not used to support the transaction configuration process 112, the bandwidth requirements of security computer system 120 is lower relative to systems in which a security computer system performs a more direct role in authenticating client devices 150. As discussed herein in reference to FIG. 4, in various instances computer system 100 might include billions of client devices 150. If a hypothetical security computer system was operable to send respective tokens 122 to some or all of these billions of client devices 150 as well as authenticating these respective tokens 122, then the hypothetical security computer system would need substantially more bandwidth capacity than the security system 120. Additionally, by distributing the authentication of tokens 122 to remote computer systems 130, there is no need to have more security computer systems 120 distributed throughout the geographic area. Having more copies of a private key or other sensitive cryptographic information used to generate tokens 122 scattered throughout the geographic area is typically less secure than having fewer copies. Moreover, because there are fewer security computer systems 120 to protect, in various instances the computer security budget that would be spent securing more computer systems can be likely be used to provide a higher level of protection to a smaller number of computer systems. Accordingly, the disclosed techniques enable transaction service 110 to perform transaction configuration process 112 with reduced latency and increased security compared to other approaches.

Figure 2:
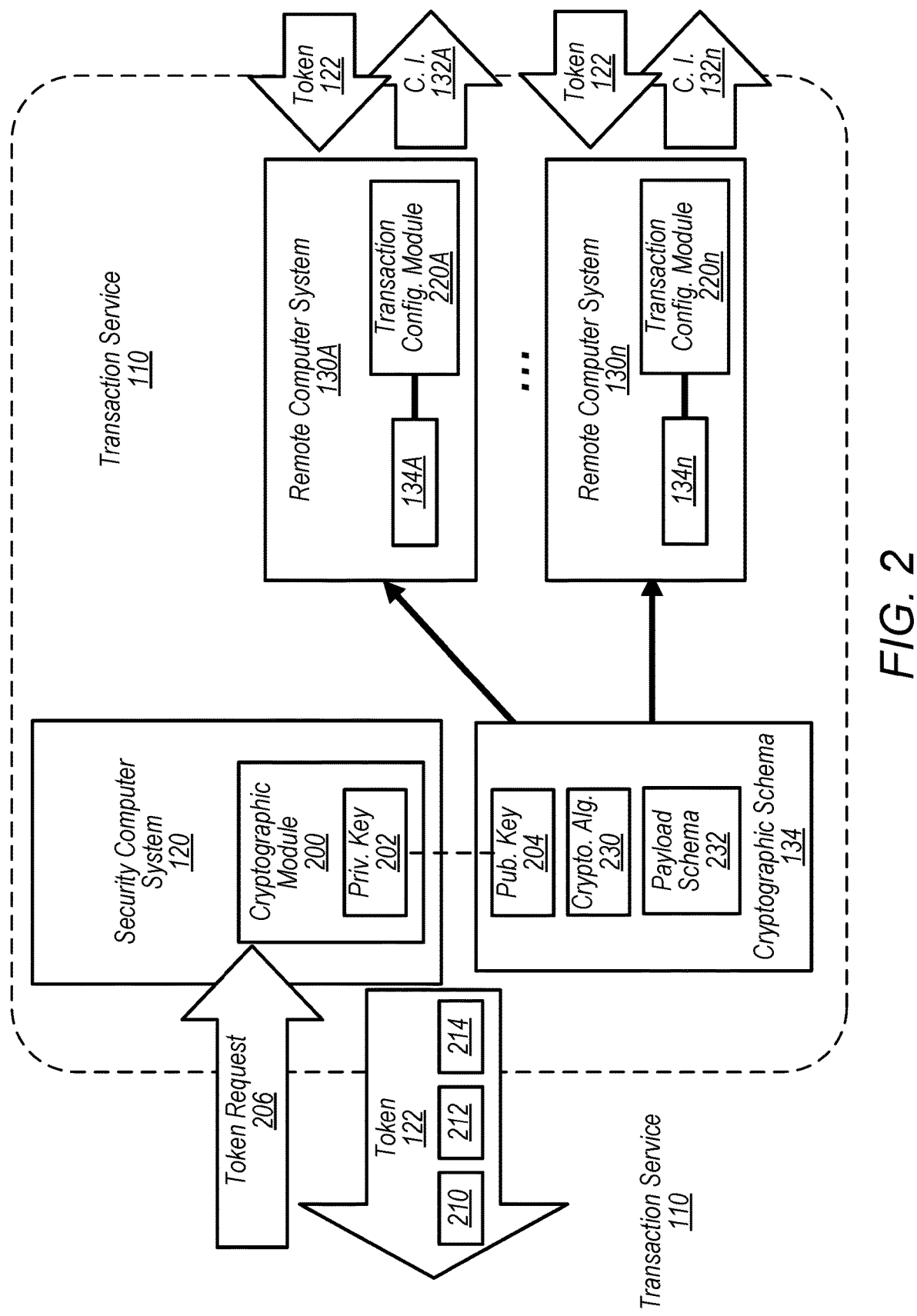
FIG. 2 is an expanded block diagram of the transaction service of FIG. 1 in accordance with various embodiments.

Referring now to FIG. 2, an expanded block diagram is shown of transaction service 110 in accordance with various embodiments. Transaction service 110 includes at least one security computer system 120 and a plurality of remote computer systems 130A-n that utilize cryptographic schema 134. While FIG. 2, depicts only one security computer system 120 and one cryptographic schema 134, in various embodiments more than one of some or all of these components may be present.

Security computer system 120 includes cryptographic module 200. Cryptographic module 200 is operable to generate token 122 according to cryptographic schema 134. In various embodiments, token 122 includes a cryptographic key 210, metadata 212 about the token 122, and a payload 214. For example, token 122 is a JSON web token that includes a cryptographic key 210, metadata 212 about the token 122, and a payload 214 in some embodiments. In various embodiments, cryptographic key 210 is generated by cryptographic module 200 using any of a number of cryptographic algorithms including but not limited asymmetric cryptography or symmetric cryptography.

In various embodiments, token 122 is generated in response to request 206 from third-party computer system 140. In some of such embodiments, information contained in request 206 is used to generate token 122. For example, in some embodiments request 206 includes a second cryptographic key that authenticates third-party computer system 140 with security computer system 120. In some embodiments, request 206 includes an indication of third-party computer system 120 and/or an indication of an entity associated with third-party computer system 120 (e.g., a unique identifier of a particular merchant). In various embodiments, information included in request 206 is used to generate cryptographic key 210 and/or is included in metadata 212 and/or payload 214.

In various embodiments, cryptographic key 210 is generated by cryptographic module 200 using a private key 202. In such embodiments, cryptographic key 210 is then able to be authenticated by a computer system with the corresponding public key 204. In various embodiments, cryptographic schema 134 includes an indication of public key 204 (e.g., a location at which public key 204 can be obtained, the public key 204 itself). Metadata 212 indicates information about token 122 in various embodiments. For example, in some embodiments, metadata 212 includes but is not limited to: a time/date at which token 122 was generated, an expiration time/date for token 122 (e.g., 8 hours after generation of token 122), an indicator of the particular security computer system 120 that generated token 122, an indication of client device 150 and/or a user account associated with client device 150, an indication of a third-party computer system 140 and/or an account (e.g., a merchant account) within transaction service 110 associated with third-party computer system 140, or any combination.

In various embodiments, payload 214 identifies the privileges within the context of transaction service 110 that have been granted to client device 150 and/or a user associated with client device 150. In various embodiments, such privileges include but are not limited to: (a) a level of access granted to requests from client device 150 (e.g., in embodiments where the contemplated transaction is access to secure files, a "general" access level, a "confidential" access level, or a "top secret" access level), (b) user preferences of a user account associated with client device 150 (e.g., a default selection of a particular form of payment), (c) a quality of service level granted to requests from client device 150 (e.g., a higher quality of service in which request for a particular client device 150 are prioritized over lower qualities of service), (d) restrictions on access to request from client device 150 imposed by third-party computer system 140 and/or transaction service 110. In various embodiments, some information discussed herein as being metadata 212 is included in payload 214 such that payload 214 includes an identification of privileges in addition to metadata 212.

Token 122 is generated by cryptographic module 200 based on cryptographic schema 134. A copy of cryptographic schema 134 may subsequently be used to interpret token 122 with additional or different information (e.g., a public key 204 of a public-private key pair). Thus, "cryptographic schema" broadly refers to any information usable to generate and/or interpret token 122. For example, cryptographic schema 134 includes an indication of a cryptographic algorithm 230 and an indication of a payload schema 232 used to generate token 122 in various embodiments. In various embodiments in which an asymmetric cryptographic algorithm 230 is used to generate token 122, cryptographic schema 134 includes an indication of public key 204. The indications of public key 204, cryptographic algorithm 230, and/or payload schema 232 may be the public key 204, cryptographic algorithm 230, and/or payload schema 232 themselves or a location (e.g., a URL) from which the public key 204, cryptographic algorithm 230, and/or payload schema 232 can be obtained in various embodiments. In various embodiments, public key 204 is the public key of a public-private asymmetric key pair corresponding to private key 202 that is used to generate token 122. In such embodiments, public key 204 is useable to authenticate token 122 (e.g., by authenticating cryptographic key 210). In various embodiments, cryptographic algorithm 230 may be any of a number of cryptographic algorithms including but not limited to asymmetric cryptography.

In various embodiments, payload schema 232 indicates what information is included and how such information is stored in payload 214. In various embodiments, for example, payload schema 232 indicates the significance of particular bit positions in payload 214 such that remote computer systems 130 are able to read payload 214 and respond accordingly. For example, payload schema 232 might indicate that payload 214 is 128 bits long and that bits 0-3 correspond to the level of access granted to requests from client device 150 (e.g., 0001 corresponds to general access, 0010 corresponds to confidential access, etc.) and bits 4-7 correspond to restrictions on access to requests from client device 150. In various embodiments, different transaction configuration modules 220 of different remote computer systems 130 are operable to utilize different portions of payload 214 to perform different portions of transaction configuration process 112. In some of such embodiments, payload schema 232 indicates which portions of payload 214 correspond to various portions of transaction configuration process 112. In various embodiments, the various components of cryptographic schema 134 are distributed to remote computer systems 130 together, but in other embodiments the various components are distributed separately. For example, cryptographic algorithm 230 and payload schema 232 are included in transaction configuration module 220 at installation and public key 204 changes periodically and remote computer systems 130 fetch a copy periodically in some embodiments. Nevertheless, in the disclosed embodiments, individual remote computer systems 130 are operable to authenticate token 122 during transaction configuration process 112 independent of communication with security computer system 120 or with other remote computer systems 130.

Transaction service 110 includes a plurality of remote computer systems 130. Transaction service 110 may include any number of remote computer systems 130A-n. Individual remote computer systems 130A-n include respective copies of cryptographic schema 134 (individually labeled 134A through 130n) and respective transaction configuration modules (individually labeled 210A through 201n). As discussed herein, in various embodiments, the various individual remote computer systems 130 receive the various components of cryptographic schema 134 separately or together as discussed herein. In various embodiments, two or more remote computer systems 130 communicate with client device 150 during transaction configuration process 112. In such embodiments, a first remote computer system 130A performs a first portion of configuration process 112 and sends first configuration information 132A to client device 150 and a second remote computer system 130n performs a second portion of configuration process and sends second configuration information 132n. As discussed in further detail in reference to FIG. 3, configuration information 132A-132n are useable by client device 150 to facilitate the contemplated transaction.

Transaction configuration module 220 is operable to determine whether to grant a request for transaction configuration information from client device 150, to generate transaction configuration information 132, and to send configuration information 132 to client device 150. In various embodiments, the determination of whether to grant a request for transaction configuration information is based on both of an authentication of cryptographic key 210 using public key 204 and an analysis of payload 214. In such embodiments, analyzing payload 214 includes transaction configuration module 220 using payload schema 232 to analyze payload 214 to determine whether the privileges contained in payload 214 satisfy one or more criteria (e.g., determining whether the privileges are indicative of sufficient access privileges). In various embodiments, information included in payload 214 is used to generate configuration information 132 (e.g., portions of payload 214 are included in configuration information 132, portions of payload 214 are used to determine information that is included in configuration information 132).

In various embodiments, token 122 includes an indicator of an entity associated with third-party computer system 140 (e.g., a merchant that is using third-party computer system 140 to operate an ecommerce storefront). In various embodiments, this indicator may be included in metadata 212 or in payload 214. In other embodiments, this indicator may be included in cryptographic key 210 in an encrypted form that becomes readable after cryptographic key 210 is decrypted with public key 204. After a particular remote computer system 130 has identified the entity associated with third-party computer system 140, that particular remote computer systems 130 is operable to include information corresponding to that entity in configuration information 132. For example, such configuration information 132 includes information indicative of preferences that have been set by the entity associated with third-party computer system 140 (e.g., indications of forms of payment that have been approved by the entity). In some embodiments, first configuration information 132A includes information that assists client device 150 in obtaining or interpreting subsequently received second configuration information 132n from a second remote computer system 130n (e.g., by providing a location of the second remote computer system 130n, by facilitating an adjustment in the formatting of second configuration information 132n to a format used by transaction module 300 in FIG. 3). Accordingly, in some embodiments a first remote computer system 130A is operable to generate configuration information 132A corresponding to the particular entity associated with third-party computer system 140 and a second remote computer system 130n is operable to generate configuration information 132n corresponding to multiple, different entities (e.g., generating configuration information 132n corresponding to a particular geographic area).

In some embodiments, the request for transaction configuration information includes information about client device 150 in addition to token 122. In some of such embodiments, the determination of whether to grant the request for configuration information is based on this additional information. Moreover, in some embodiments, the configuration information 132 sent to client device 150 is based on this additional information. As discussed in further detail in reference to FIG. 3, the additional information may include but is not limited to geographic location information about client device 150 (e.g., GPS coordinates), information about the application that client device 150 is using to interface with third-party computer system 140 (e.g., a web browser type or version, a version of a dedicated application for interfacing with third-party computer system 140), and/or information about client device 150 (e.g., operating system type or version, MAC address), etc. Thus, the determination of whether to provide configuration information 132 may be based in part on the location information included in the additional information in some embodiments. In various embodiments, a request for configuration information includes a geographic indicator corresponding to a particular location of the client device, and the configuration information 132 includes information corresponding to the particular location (e.g., configuration information 132 indicates forms of payment accepted by transaction service 110 for contemplated transactions arising out of the geographic location of client device 150). In another example, the configuration information 132 may be formatted for the operating system used by client device 150 and/or for the application used by client device 150 to interface with third-party computer system 140 (e.g., transaction module 300 in FIG. 3).

Accordingly, after authenticating token 122, one or more of the remote computer systems 130 send configuration information 132 to client device 150. For example, in embodiments where the contemplated transaction is a purchase of a good offered for sale on a merchant's ecommerce storefront implemented using third-party computer system 140, configuration information 132 is indicative of: (a) the types of payment methods that the merchant accepts, (b) the location(s) (e.g., URL) of payment processing computer systems configured to process the various types of payment methods, (c) the types of payment methods that are approved by transaction service 110 for use in transactions occurring in the location of client device 150, and (d) translations into a language associated with client device 150 of text for use in the contemplated transaction. In another example, in some embodiments where a plurality of remote computer systems 130 send configuration information 132 to client device 150 during transaction configuration process 112, first configuration information 132 sent by a first remote computer system 130 could indicate the location of a second remote computer system 130 from which client device 150 can request second configuration 132. In such embodiments, for example, first remote computer system 130 is configured to direct client device 150 to a second remote computer system 130 that is geographically close to client device 150, has a shorter network path to client device 150, etc. Additionally or alternatively, first remote computer system 130 is configured to direct client device 150 to a particular second remote computer system 130 for load balancing purposes or because the particular second remote computer system 130 is ready to process another request for configuration information 132 when others are not ready at that particular moment in time.

Figure 3:
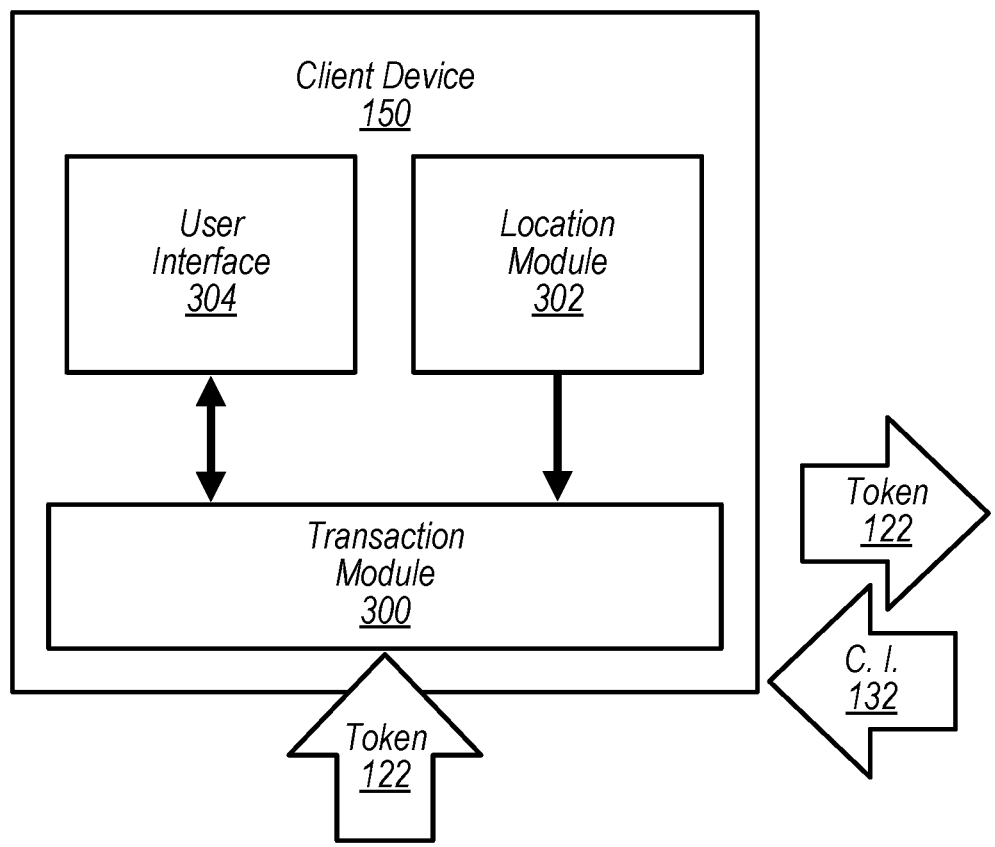
FIG. 3 is an expanded block diagram of the client device of FIG. 1 in accordance with various embodiments.

Referring now to FIG. 3, an expanded block diagram is shown of client device 150 in accordance with various embodiments. In various embodiments, client device 150 includes a transaction module 300, a location module 302, and a user interface 304.

Transaction module 300 is operable to receive token 122 (e.g., from third-party computer system 140, from security computer system 120), send token 122 to one or more remote computer systems 130, receive configuration information 132 from one or more remote computer systems 130, and perform (or attempt to perform) the contemplated transaction based on the received configuration information 132. In various embodiments, transaction module 300 is a general-usage application such as a web browser or a file manager application. In other embodiments, transaction module 300 is a dedicated application (e.g., an application for a particular ecommerce storefront, an application for accessing a secure file server). In various embodiments, token 122 includes information indicative of a user of client device 150 (e.g., a user account of the user in the context of transaction service 110), but in other embodiments token 122 does not include information about the user (e.g., in a contemplated transaction in which the user will attempt the contemplated transaction as a guest and potentially create a user account in transaction service 110 after the contemplated transaction is completed).

As discussed herein in reference to FIG. 2, in various embodiments client device 150 is operable to include token 122 in one or more requests for configuration information that are sent to one or more remote computer systems 130. In various embodiments, such requests include additional information including but not limited to (a) a geographic indicator corresponding to a location of client device 150, (b) information about one or more applications running on client device (e.g., an operating system of client device 150, a type or version of transaction module 300), (c) a language setting on client device 150, and (d) information about the installation state of one or more applications on client device 150. Subsequently, client device 150 is operable to receive configuration information 132 from one or more remote computer systems 130 that was generated in response to such requests. Transaction module 300 is operable to receive configuration information 132 and facilitate the contemplated transaction. In various embodiments, facilitating the contemplated transaction includes presenting, to a user of client device 150 via user interface 304, information based on received configuration information 132. For example, transaction module 300 may receive first configuration information 132 indicative of forms of payment approved by a merchant associated with third-party computer system 140 and second configuration information 132 indicative of forms of payment approved by transaction service 110 for transactions originating in a geographic location of client device 150. Thus, in some embodiments, user interface 304 displays one or more forms of payment from which a user can select for the contemplated transaction. In another embodiment, transaction module 300 is operable to receive configuration information 132 that includes application-specific configuration information 132 for transaction module 300 (e.g., configuration information 132 that is formatted for display by user interface 304 operating on a particular operating system of client device 150, configuration information 132 that is formatted for display with a particular type of web browser in embodiments where transaction module 300 is the particular type of web browser).

In various embodiments, location module 302 is any of a number of implementations of a geolocation determination circuit. For example, location module 302 is a Global Positioning System (GPS) circuit configured to communicate with one or more GPS satellites and/or cellular towers to determine the latitude and longitude of client device 150. In various embodiments, user interface 304 includes any of a number of user interface devices including but not limited to a visual user interface (e.g., a display, a touch screen), an audible user interface, a haptic user interface, or any combination. In various embodiments, transaction module 300 and user interface 304 present information to a user of client device 105 based on configuration information 132. For example, in embodiments when configuration information 132 is indicative of eligible payment methods useable to complete the contemplated transaction, user interface 304 is operable to present indications of the eligible payment methods.

Figure 4:
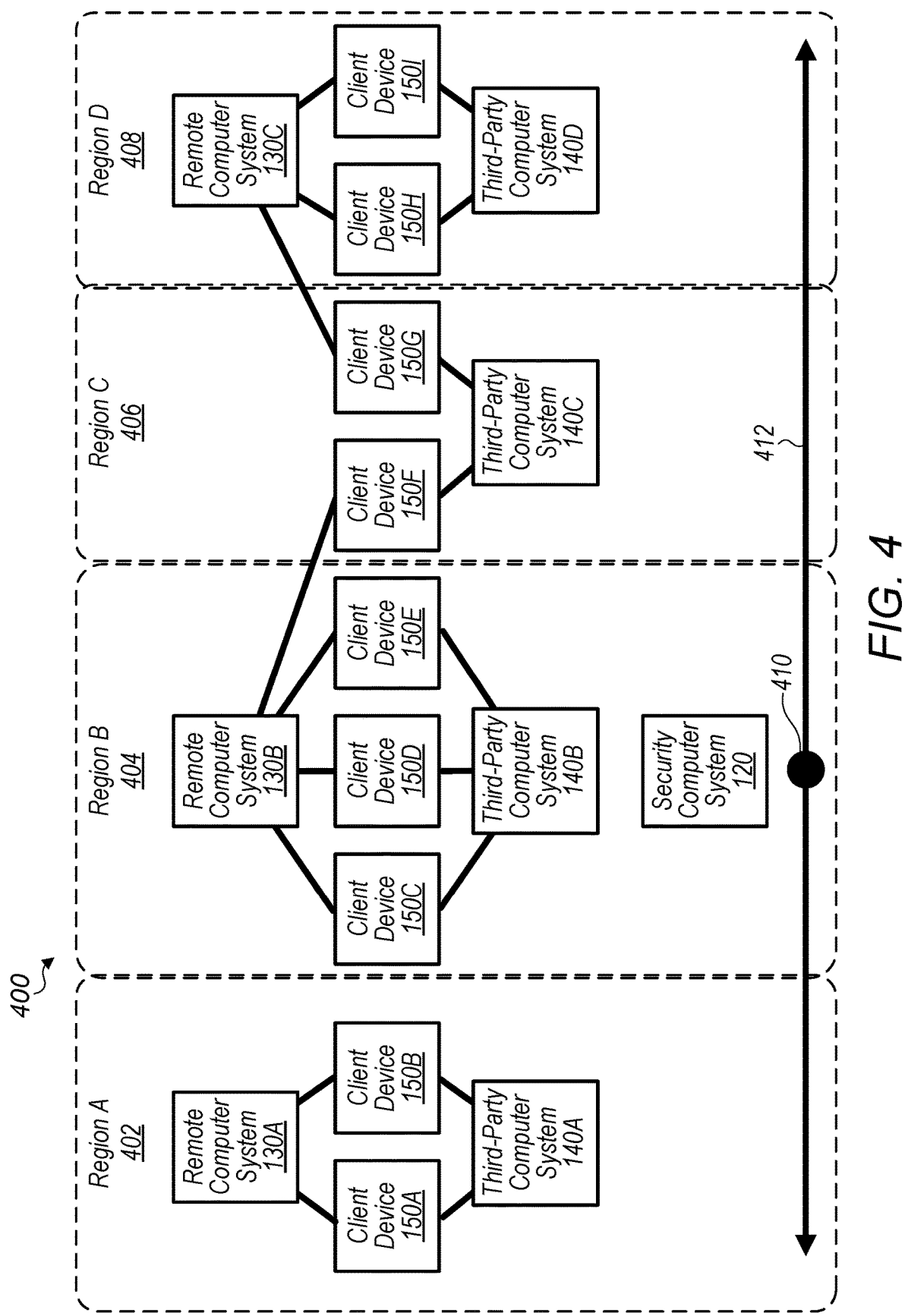
FIG. 4 is a block diagram illustrating a network of computer systems and client devices of FIG. 1 in accordance with various embodiments.

Referring now to FIG. 4, a block diagram is shown illustrating a network 400 that includes plurality of computer systems including security computer system 120, a plurality of remote computer system 130s, a plurality of third-party computer systems 140, and a plurality of client devices 150 are shown being located within Region A 402, Region B 404, Region C 406, and Region D 408. While FIG. 4 depicts a network 400 having one security computer system 120, three remote computer systems 130, four third-party computer systems 140, and nine client devices 150 located within one of four regions, it will be understood that in various embodiments a network may include any number of security computer systems 120, remote computer systems 130, third-party computer systems 140, and client devices 150 in any number of regions. For example, a network might include tens of security computer system 120, tens of thousands of remote computer systems 130, millions of third-party computer systems 140, and billions of client devices 150 spread across hundreds of regions (e.g., one or more regions for every country in the world). The various lines between components of network 400 represent communication between the various connected components during the transaction configuration process 112 discussed herein.

As shown in FIG. 4, the various components of network 400 are located in Region A 402, Region B 404, Region C 406, and Region D 408. Region A 402 includes third-party computer system 140A, which is in communication with client devices 150A and 150B, which are in communication with remote computer system 130A. Region B 404 includes security computer system 120, third-computer system 140B, which is in communication with client devices 150C, 150D, 150E, which are in communication with remote computer system 140B. Region C 406 includes third-computer system 140B, which is in communication with client devices 150F and 150G. Because there is no remote computer system 130 in Region C 406, client device 150F is in communication with remote computer system 140B in Region B 404 and client device 150F is in communication with remote computer system 140C in Region D 408. Region D 408 includes third-party computer system 140D, which is in communication with client devices 150H and 150I, which are in communication with remote computer system 130C.

Region A 402, Region B 404, Region C 406, and Region D 408 represent geographic areas in which the various components within them are physically located. For example, if Region A 402 is Texas and Region B 404 is Oklahoma, then the components shown in Region A 402 and Region B 404 are physically located within Texas and Oklahoma respectively. As shown in FIG. 4, some communication links between components cross the boundaries of regions in various embodiments. Further, security computer system 120 is located at location 410 within Region B 404. The relative distance between various components of network 400 extends along line 412 such that while third-party computer system 140B is relatively geographically closer to security computer system 120, remote computer system 130C is much more distant. Moreover, in various instances, the particular remote computer system 130 with which a particular client device 150 communicates is geographically closer to the particular client device 150 than the security computer system 120. For example, client device 150I is geographically closer to remote computer system 130C than to security computer system 120. In some embodiments, security computer system 120 is relatively centralized within network 400 and the various remote computer systems 130 are edge servers.

Accordingly, while communication between third-party computer system 140B and security computer system 120 might have relatively low latency, communication between remote computer system 130C and security computer system 120 would have substantially more latency because of the difference in physical distance and/or a longer transmission pathway. As discussed herein, by eliminating communication between security computer system 120 and remote computer systems 130 during the transaction configuration process, the potential latency resulting from such communication is likewise eliminated from the transaction configuration process. Accordingly, the amount of time used in the transaction configuration process is reduced and the viability due to different latencies between security computer system 120 and remote computer systems 130 is reduced.

Figure 5:
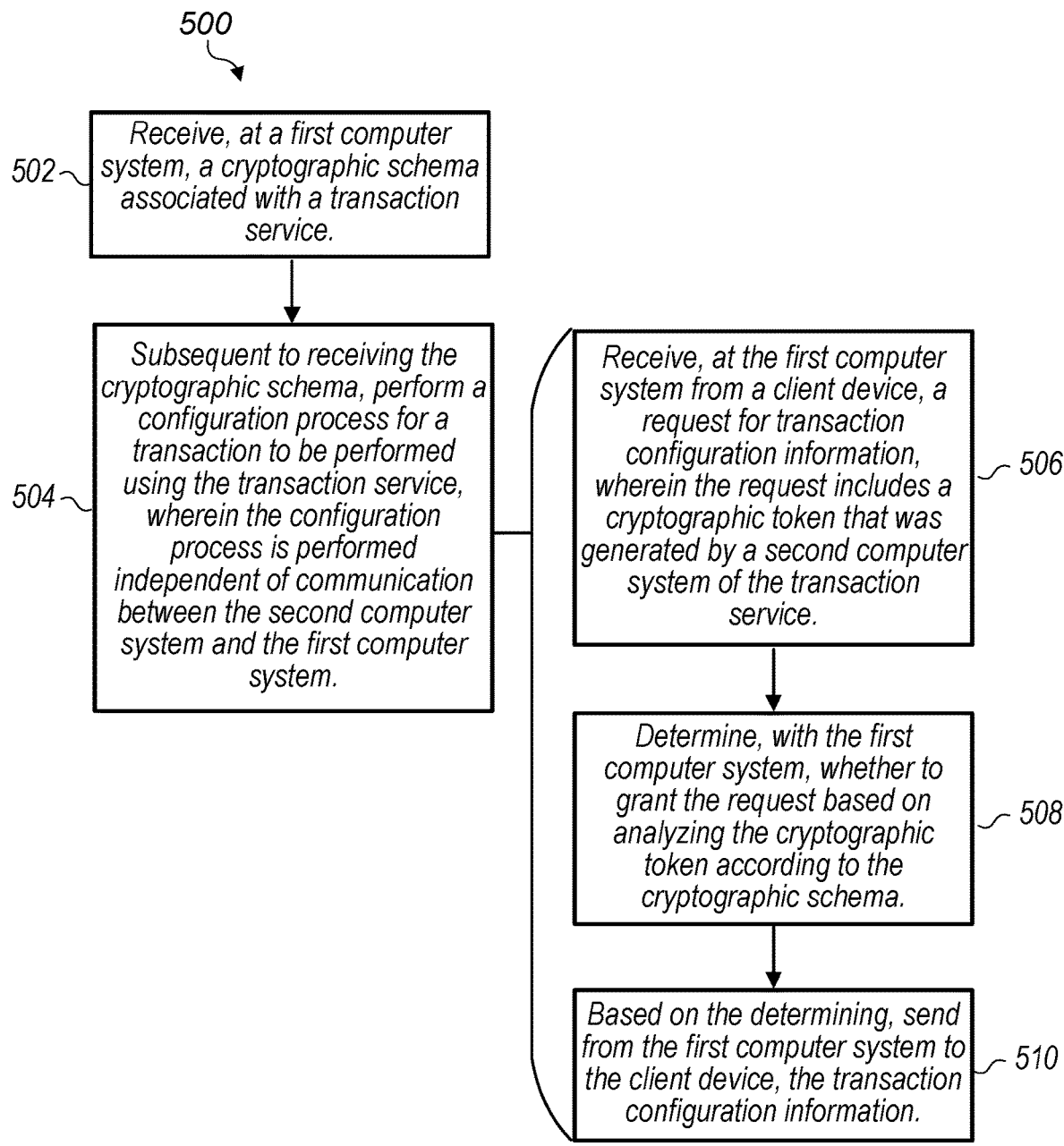
FIG. 5 is flowchart illustrating an embodiment of a server-side transaction configuration method in accordance with various embodiments.
Figure 6:
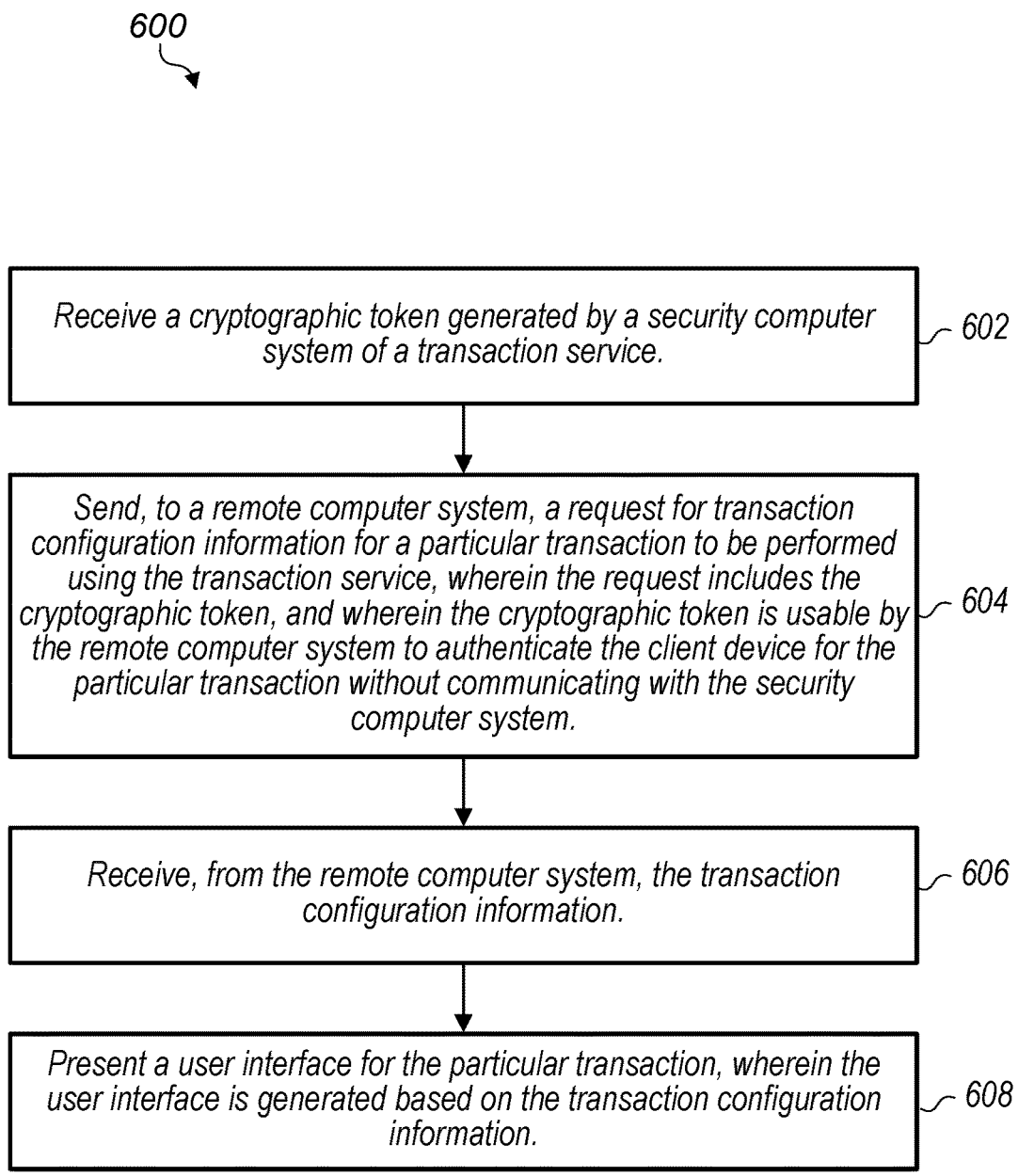
FIG. 6 is flowchart illustrating an embodiment of a client-side transaction configuration method in accordance with various embodiments.

FIGS. 5 and 6 illustrate various flowcharts representing various disclosed methods implemented with computer system 100. Referring now to FIG. 5, a flowchart depicting a server-side transaction configuration method 500 is depicted. In the embodiment shown in FIG. 5, the various actions associated with method 500 are implemented by remote computer system 130. As discussed in FIG. 5, remote computer system 130 and security computer system 120 are referred to as "first computer system" and "second computer system," respectively. The techniques discussed in connection to FIG. 5, however, are applicable to any two computer system and are not limited to the structures disclosed herein pertaining to remote computer system 130 and security computer system 120.

At block 502, first computer system receives cryptographic schema 134 associated with transaction service 110. At block 504, subsequent to receiving cryptographic schema 134, a transaction configuration process 112 is performed for a transaction to be performed using the transaction service. In various embodiments, the first computer system performs portions of transaction configuration process 112 including the tasks corresponding to blocks 506, 508, and 510 independent of communication between the second computer system and the first computer system. At block 506, first computer system receives from client device 150 request for transaction configuration information. The request includes a cryptographic token 122 that was generated by a second computer system of transaction service 110. At block 508, first computer system determines whether to grant the request based on analyzing cryptographic token 122 according to cryptographic schema 134. At block 510, based on the determining in in block 508, first computer system sends transaction configuration information 132 to client device 150.

Referring now to FIG. 6, a flowchart depicting a client-side transaction configuration method 600 is depicted. In the embodiment shown in FIG. 6, the various actions associated with method 600 are implemented by client device 150. At block 602, client device 150 receives a cryptographic token 122 generated by security computer system 120 of transaction service 110. At block 604, client device 150 sends to a remote computer system 130, a request for transaction configuration information for a particular transaction to be performed using the transaction service 110. The request includes cryptographic token 122, which is usable by the remote computer system 130 to authenticate the client device 150 for the particular transaction without communicating with the security computer system 120. At block 606, client device 150 receives transaction configuration information 132 from remote computer system 130. At block 608, client device presents a user interface 304 for the particular transaction. The user interface 304 is generated based on the transaction configuration information 132.

Referring again to FIGS. 1-6, in a non-limiting example, a user uses a particular client device 150H located in a particular region (e.g., Region D 408) to access an ecommerce storefront that is associated with third-party computer system 140D located in the same region. The user selects an item from the ecommerce storefront, puts it into the user's electronic shopping cart, and selects a command to check out. As a result of the check-out command, a transaction process is initiated. Third-party computer system 140D requests a token 122 to be used during the transaction process from security computer system 120 (e.g., in Region B 404). Security computer system 120 generates token 122 according to cryptographic schema 134 and sends token 122 to third-party computer system 140D. After receiving token 122, third-party computer system 140D sends token 122 to client device 150H.

In this example, two different remote computer systems 130 are used to perform transaction configuration process 112: a first remote computer system 130A that is associated with the ecommerce storefront and a second remote computer system 130B that corresponds to Region D 408 (prior to the command to check out, both first remote computer system 130A and second remote computer system 130B received a copy of cryptographic schema 134 usable to authenticate and interpret token 122). As part of transaction configuration process 112, client device 150H requests configuration information 132 from both first remote computer system 130A and second remote computer system 130B using token 122. In response, both of both first remote computer system 130A and second remote computer system 130B separately evaluate token 122 as part of determining whether to grant their respective requests for configuration information 132: first remote computer system 130A authenticates cryptographic key 210 and interprets a first portion of payload 214 using a copy of cryptographic schema 134, and second remote computer system 130B authenticates cryptographic key 210 and interprets a second, different portion of payload 214 using a separate copy of cryptographic schema 134. After authenticating token 122, first remote computer system 130A sends configuration information 132A (e.g., indicating a payment processing system associated with the ecommerce storefront) to client device 150H and second remote computer system 130B sends configuration information 132B (e.g., indicating a plurality of forms of payment available for use in Region D 408) to client device 150H. Neither of first remote computer system 130A nor second remote computer system 130B communicate with security computer system 120 or each other during transaction configuration process 112. Having received configuration information 132A and configuration information 132B, client device 150H presents a user interface 304 for the transaction based on the received configuration information 132A and 132B. In this example, the user is presented with one or more forms of payment to use for the transaction to pay for the item in the electronic shopping cart.

Exemplary Computer System

Figure 7:
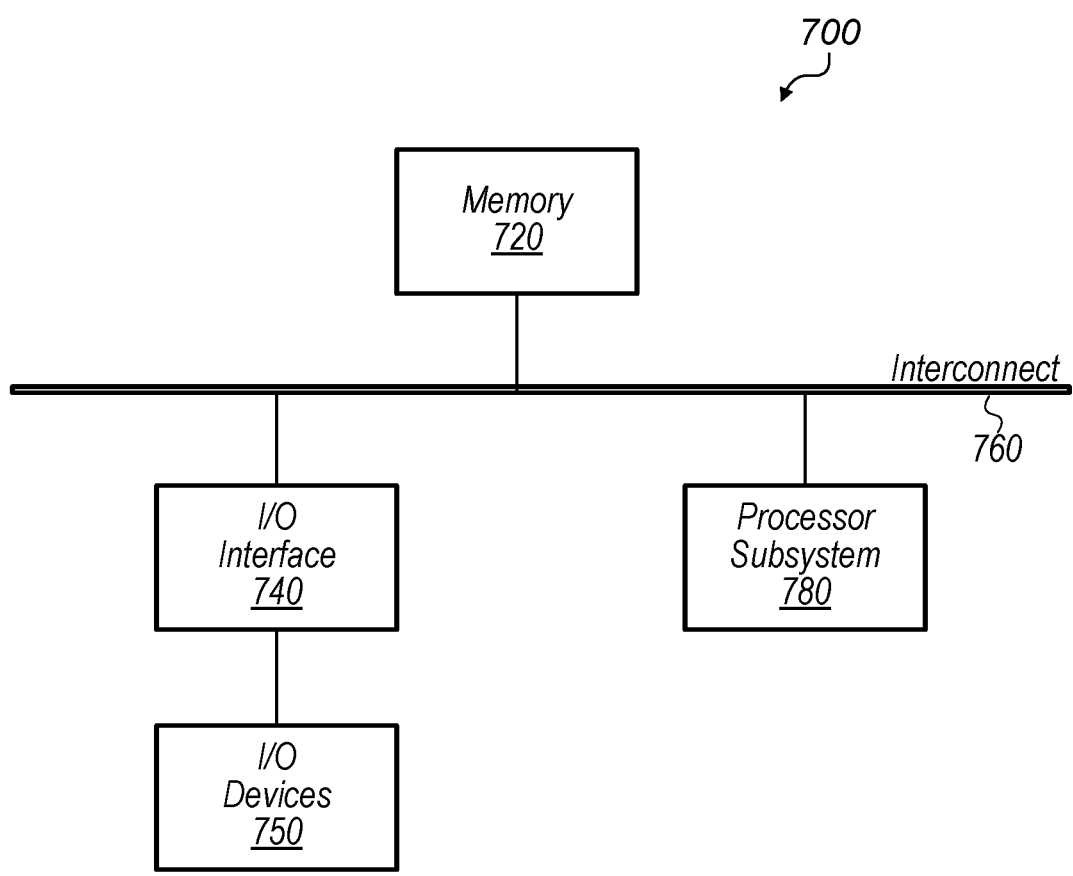
FIG. 7 is a block diagram of an exemplary computer system, which may implement the various components of FIGS. 1, 2, 3, and 4.

Turning now to FIG. 7, a block diagram of an exemplary computer system 700, which may implement the various components of computer system 100 (e.g., security computer system 120, remote computer system 130, third-party computer system 140, client device 150) is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable to store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer system comprising:
   a first computer processor circuit of a transaction service;
   a second computer processor circuit of the transaction service; and
   the first computer processor circuit being configured to:
   access a cryptographic schema associated with the transaction service, the cryptographic schema comprising a public key of a public-private key pair, a cryptographic algorithm, and a payload schema identifying privileges granted to a client device;
   receive, from the client device, a request for transaction configuration information for a transaction, the request comprising a cryptographic token and information about one or more applications running on the client device and a geographic indicator corresponding to a location of the client device;
   authenticate, without performing any communication with the second computer processor circuit, the cryptographic token from the request using the public key and the payload schema from the accessed cryptographic schema on a payload of the cryptographic token to determine whether the privileges granted to the client device satisfy one or more criteria;
   determine to grant the request based on the authentication of the cryptographic token according to the accessed cryptographic schema;
   generate the transaction configuration information using the payload of the cryptographic token and the information about the one or more applications running on the client device and the geographic indicator, wherein the transaction configuration information is formatted for the one or more applications;
   in response to determining to grant the request, send the generated transaction configuration information to the client device;
   the second computer processor circuit being configured to:
   access the cryptographic schema associated with the transaction service;
   generate the cryptographic token using a private key of the public-private key pair using the cryptographic algorithm and the payload schema, wherein the cryptographic token comprises a cryptographic key signed with the private key, metadata about the cryptographic token, and the payload identifying privileges granted to the client device; and
   transmit the cryptographic token to the client device.

2. The computer system of claim 1, wherein the first computer processor circuit is an edge server computer processor circuit that is associated with the transaction service and the second computer processor circuit is a security computer processor circuit that is associated with the transaction service.

3. The computer system of claim 2, further comprising a second edge server computer processor circuit that is associated with the transaction service;
   wherein the configuration process includes the second edge server computer processor circuit performing a second configuration process for the transaction; and
   wherein the edge server computer processor circuit, the second edge server computer processor circuit, and the security computer processor circuit do not communicate during the configuration process or the second configuration process.

4. The computer system of claim 1, wherein the transaction is associated with a particular merchant, the cryptographic token includes a merchant identifier indicative of the particular merchant, and the transaction configuration information includes information corresponding to the particular merchant.

5. The computer system of claim 1, wherein the transaction configuration information is generated using the geographic indicator and includes information corresponding to the location of the client device.

6. A method comprising:
   accessing, by a first computer processor circuit of a transaction service, a cryptographic schema associated with the transaction service, the cryptographic schema comprising a public key of a public-private key pair, a cryptographic algorithm, and a payload schema identifying privileges granted to a client device;
   generating, by the first computer processor circuit, a cryptographic token using a private key of the public-private key pair using the cryptographic algorithm and the payload schema, wherein the cryptographic token comprises a cryptographic key signed with the private key, metadata about the cryptographic token, and the payload identifying privileges granted to the client device;
   transmitting, by the first computer processor circuit, the cryptographic token to the client device;
   receiving, at a second computer processor circuit from the client device, a request for transaction configuration information for a transaction, the request comprising the cryptographic token and information about one or more applications running on the client device and a geographic indicator corresponding to a location of the client device;

accessing, by second computer processor circuit, the cryptographic schema associated with the transaction service;

authenticating, at the second computer processor circuit and without performing any communication with the first computer processor circuit, the cryptographic token from the request using the public key and the payload schema from the accessed cryptographic schema on a payload of the cryptographic token to determine whether the privileges granted to the client device satisfy one or more criteria;

determining, at the second computer processor circuit, to grant the request based on the authentication of the cryptographic token according to the accessed cryptographic schema;

generating, at the second computer processor circuit, the transaction configuration information using the payload of the cryptographic token and the information about the one or more applications running on the client device and the geographic indicator, wherein the transaction configuration information is formatted for the one or more applications; and in response to determining to grant the request at the second computer processor circuit, sending the generated transaction configuration information to the client device.

7. The method of claim 6, further comprising:

sending, from the client device to a third computer processor circuit, a second request for second transaction configuration information for a particular transaction to be performed using the transaction service, wherein the second request includes the cryptographic token, and wherein the cryptographic token is usable by the third computer processor circuit to authenticate the client device for the particular transaction according to the cryptographic schema and generate the second transaction configuration information without additional communication with the first computer processor circuit that affects the cryptographic token or the generation of the second transaction configuration information;

wherein the privileges include a first set of privileges associated with tasks performed by the second computer processor circuit and a second, different set of privileges associated with tasks performed by the third computer processor circuit.

8. The method of claim 6, wherein the second computer processor circuit is geographically closer to the client device than the first computer processor circuit.

9. The method of claim 6, wherein the transaction configuration information includes application-specific configuration information.

10. The method of claim 6, wherein the transaction configuration information includes region-specific configuration information.

11. The method of claim 6, wherein the request is associated with a particular end user who is not registered with the first computer processor circuit, and the cryptographic token does not include a user identifier indicative of the particular end user.

12. The method of claim 6, wherein the transaction configuration information includes information corresponding to the location of the client device.

13. A method comprising:

accessing, by a first computer system of a transaction service, a cryptographic schema associated with the transaction service, the cryptographic schema comprising a public key of a public-private key pair, a cryptographic algorithm, and a payload schema identifying privileges granted to a client device;

generating, by the first computer system, a cryptographic token using a private key of the public-private key pair using the cryptographic algorithm and the payload schema, wherein the cryptographic token comprises a cryptographic key signed with the private key, metadata about the cryptographic token, and the payload identifying privileges granted to the client device;

transmitting, by the first computer system, the cryptographic token to the client device;

receiving, at a second computer system from the client device, a request for transaction configuration information for a transaction, the request comprising the cryptographic token and information about one or more applications running on the client device and a geographic indicator corresponding to a location of the client device;

accessing, by second computer system, the cryptographic schema associated with the transaction service;

authenticating, at the second computer system and without performing any communication with the first computer system, the cryptographic token from the request using the public key and the payload schema from the accessed cryptographic schema on a payload of the cryptographic token to determine whether the privileges granted to the client device satisfy one or more criteria;

determining, at the second computer system, to grant the request based on the authentication of the cryptographic token according to the accessed cryptographic schema;

generating, at the second computer system, the transaction configuration information using the payload of the cryptographic token and the information about the one or more applications running on the client device and the geographic indicator, wherein the transaction configuration information is formatted for the one or more applications; and in response to determining to grant the request at the second computer system, sending the generated transaction configuration information to the client device.

14. The method of claim 13, further comprising:

sending, from the client device to a third computer system, a second request for second transaction configuration information for a particular transaction to be performed using the transaction service, wherein the second request includes the cryptographic token, and wherein the cryptographic token is usable by the third computer system to authenticate the client device for the particular transaction according to the cryptographic schema and generate the second transaction configuration information without additional communication with the first computer system that affects the cryptographic token or the generation of the second transaction configuration information;

wherein the privileges include a first set of privileges associated with tasks performed by the second computer system and a second, different set of privileges associated with tasks performed by the third computer system.

15. The method of claim 13, wherein the second computer system is geographically closer to the client device than the first computer system.

16. The method of claim 13, wherein the transaction configuration information includes application-specific configuration information.

17. The method of claim 13, wherein the transaction configuration information includes region-specific configuration information.

18. The method of claim 13, wherein the request is associated with a particular end user who is not registered with the first computer system, and the cryptographic token does not include a user identifier indicative of the particular end user.

19. The method of claim 13, wherein the transaction configuration information includes information corresponding to the location of the client device.

\* \* \* \* \*